United States Patent
Chung et al.

(10) Patent No.: US 11,347,487 B2
(45) Date of Patent: May 31, 2022

(54) CONFINING REFLECTIVE ACCESS BASED ON MODULE BOUNDARIES

(71) Applicant: Oracle International Corporation, Redwood Shores, CA (US)

(72) Inventors: Lai Hung Mandy Chung, Saratoga, CA (US); John Robert Rose, San Jose, CA (US); Alan Bateman, Dublin (IE)

(73) Assignee: Oracle International Corporation, Redwood Shores, CA (US)

( * ) Notice: Subject to any disclaimer, the term of this patent is extended or adjusted under 35 U.S.C. 154(b) by 334 days.

(21) Appl. No.: 16/691,345

(22) Filed: Nov. 21, 2019

(65) Prior Publication Data

US 2020/0409674 A1 Dec. 31, 2020

Related U.S. Application Data

(60) Provisional application No. 62/867,210, filed on Jun. 26, 2019.

(51) Int. Cl.
*G06F 9/44* (2018.01)
*G06F 8/41* (2018.01)
(Continued)

(52) U.S. Cl.
CPC .............. *G06F 8/447* (2013.01); *G06F 8/30* (2013.01); *G06F 9/45533* (2013.01); *G06F 21/31* (2013.01); *G06F 2009/45587* (2013.01)

(58) Field of Classification Search
CPC ........ G06F 8/447; G06F 8/30; G06F 9/45533; G06F 21/31

(Continued)

(56) References Cited

U.S. PATENT DOCUMENTS 6,085,191 A * 7/2000 Fisher ...................... G06F 1/00
707/737
6,330,717 B1 * 12/2001 Raverdy ................... G06F 8/24
717/170

(Continued)

OTHER PUBLICATIONS

Title: The Epistemological Significance of Reflective Access, author: CE Hanson , published on 2010.*

(Continued)

*Primary Examiner* — Chameli Das
(74) *Attorney, Agent, or Firm* — Invoke

(57) ABSTRACT

A module (m1) is allowed to gain private reflective access to any class in any module (C2 in m2), if and only if m2 grants to m1 deep reflective access for C2. A caller class may invoke a method to generate a second lookup object associated with a second principal class based on a first lookup object associated with a first principal class. The method is successfully executed only if (a) an access mode of the first lookup object allows for teleporting with private reflective access and (b) a module including the second principal class grants to a module including the first principal class deep reflective access for the second principal class. The second lookup object drops the access mode allowing for teleporting with private reflective access. Hence reflective access is confined within the limits imposed by module boundaries, as relaxed by access agreements between pairs of modules. The bilateral agreements are not transferable to other modules.

20 Claims, 13 Drawing Sheets

(51) Int. Cl.
*G06F 8/30* (2018.01)
*G06F 9/455* (2018.01)
*G06F 21/31* (2013.01)

(58) Field of Classification Search
USPC ........................................................ 717/106
See application file for complete search history.

(56) References Cited

U.S. PATENT DOCUMENTS 10,367,822 B2 * 7/2019 Buckley ................ G06F 9/4488
2004/0015858 A1 * 1/2004 Seto ........................ G06F 9/449
717/120

OTHER PUBLICATIONS

Title: Proposed NIST standard for role-based access control; author: DF Ferraiolo, published on 2001.*

Java Bug System, "Lookup.in should allow teleporting from a lookup class in a named module without dropping all access", JDK-8173978, available online at <https://bugs.openjdk.java.net/browse/JDK-8173978>, Jun. 20, 2019, 1 page.

Lindholm et al., "The Java® Virtual Machine Specification", Java SE 12 Edition, Chapter 5. Loading, Linking, and Initializing, available online at <https://docs.oracle.com/javase/specs/jvms/se12/html/jvms-5.html#jvms-5.1>, Feb. 8, 2019, 33 pages.

Oracle "Class MethodHandles.Lookup (Java SE 12 & JDK 12)", available online at <https://docs.oracle.com/en/java/javase/12/docs/api/java.base/java/lang/invoke/MethodHandles.Lookup.html>, retrieved on Jun. 12, 2019, 30 pages.

Oracle, "Class MethodHandles (Java SE 12 & JDK 12 )", available online at <https://docs.oracle.com/en/java/javase/12/docs/api/java.base/java/lang/invoke/MethodHandles.html#privateLookupIn (java.lang.Class.java.lang.invoke.MethodHandles.Lookup)>, retrieved on Jun. 12, 2019, 34 pages.

* cited by examiner

Module Graph
502

CONFINING REFLECTIVE ACCESS BASED ON MODULE BOUNDARIES

INCORPORATION BY REFERENCE; DISCLAIMER

Each of the following applications is hereby incorporated by reference: Application No. 62/867,210 filed on Jun. 26, 2019.

Applicant hereby rescinds any disclaimer of claim scope in the parent application(s) or the prosecution history thereof and advises the USPTO that the claims in this application may be broader than any claims in the parent application(s).

TECHNICAL FIELD

The present disclosure relates to reflective access. In particular, the present disclosure relates to confining reflective access based on module boundaries.

BACKGROUND

A compiler converts source code, which is written according to a specification directed to the convenience of the programmer, to machine or object code. Machine or object code is executable directly by the particular machine environment. Alternatively, a compiler converts source code to an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
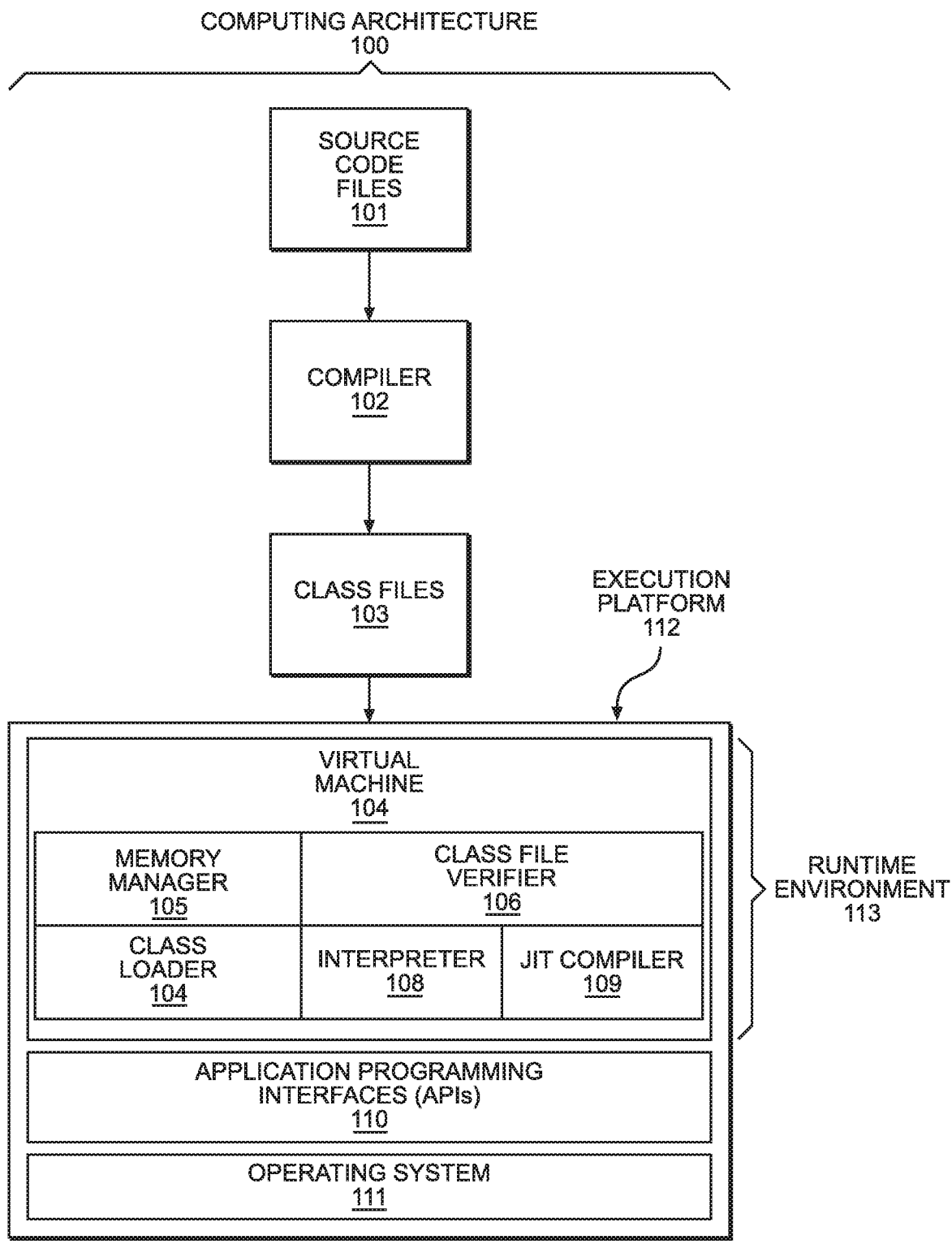
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. MODULES
   3.1 MODULE DECLARATIONS
   3.2 MODULE DEPENDENCIES
   3.3 EXPORTED AND OPENED PACKAGES
   3.4 ACCESS CONTROL
   3.5 UNNAMED MODULE
4. REFLECTIVE ACCESS AND LOOKUP OBJECTS
   4.1 REFLECTIVE ACCESS
   4.2 ACCESS CHECKING
5. GENERATING A NEW LOOKUP OBJECT BASED ON AN EXISTING LOOKUP OBJECT
6. EXAMPLE EMBODIMENTS
7. MISCELLANEOUS; EXTENSIONS
8. HARDWARE OVERVIEW

1. General Overview

One or more embodiments include confining reflective access based on module boundaries. Without explicit permissions, module boundaries by default do not allow a module to have reflective access to members of another module. A module (m2) may be associated with a particular directive or clause to grant, to another module (m1), reflective access for certain private members of m2. In such a case, m2 may be referred to as granting "deep reflective access" to m1. Confining reflective access based on module boundaries involves allowing a module (m1) to gain private reflective access to any class in any module (C2 in m2), if and only if m2 grants to m1 deep reflective access for C2.

In one or more embodiments, reflective access is obtained through the use of a lookup object. A lookup object's reflective access is defined based on (a) a principal class of the lookup object and (b) a set of access modes of the lookup object. The access modes are interpreted with respect to the principal class. For example, if the access modes include turning ON at least a PRIVATE bit, then a lookup object has reflective access to at least private members (such as fields and methods) of the principal class. The lookup object may be referred to as having "private reflective access" to members of the principal class. If the access modes include turning ON at least a MODULE bit, then the lookup object has reflective access to public members of public types (such as classes and interfaces) of at least a module including the principal class, regardless of whether the module exports the types. A class that invokes a method to generate a lookup object may be referred to herein as a "caller class." A module including such a class may be referred to herein as a "caller module."

In one or more embodiments, a caller class (C1) in a caller module (m1) is able to invoke a method to generate a lookup object (lookup1) associated with (a) a principal class that is C1 itself and (b) private reflective access. Further, C1 is able to invoke another method to generate a lookup object (lookup2) associated with (a) a principal class that is any class in any module (C2 in m2) and (b) private reflective access, by supplying an existing lookup object (lookup1) as a basis for satisfying access check requirements for generating lookup2. The method successfully executes to generate lookup2 if inter alia:
  (a) an access mode of lookup1 permits generating a new lookup object associated with (i) private reflective access and (ii) a principal class different than the principal class of lookup1 (referred to herein as "teleporting with private reflective access"); and
  (b) m2 grants to m1 deep reflective access for C2.

Based on a successfully generated lookup2, C1 in m1 may execute reflective access operations on private members of C2 in m2. In the above scenarios, since m2 grants to m1 deep reflective access for C2, the module boundary between m1 and m2 has been respected.

In one or more embodiments, generating lookup2, as described above, includes dropping an access mode of lookup2 that allows teleporting with private reflective access. If the opposite were true—lookup2 is generated with an access mode that allows teleporting with private reflective access—then C1 would be able to invoke the method again to generate a lookup object (lookup3) associated with (a) a principal class that is any class in any module (C3 in m3) and (b) private reflective access, by supplying lookup2 as a basis for satisfying access check requirements for generating lookup3. As long as m3 grants to m2 deep reflective access for C3, and regardless of whether m3 grants to m1 deep reflective access for C3, the method would successfully execute to generate lookup3. Based on lookup3, C1 in m1 may execute reflective access operations on private members of C3 in m3. In the above scenarios, since m3 does not necessarily grant to m1 deep reflective access for C3, the module boundary between m1 and m3 has not been respected.

Therefore, the access mode permitting teleporting with private reflective access must be carefully granted. A lookup object (such as lookup1) with the access mode permitting teleporting with private reflective access can only be generated if the principal class of the lookup object is within the caller module (for example, if the principal class of the lookup object is the caller class itself). A lookup object (such as lookup2) whose principal class is not within the caller module must (a) be generated based on another lookup object associated with the access mode permitting teleporting with private reflective access and (b) drop the access mode permitting teleporting with private reflective access. Since the access mode is dropped, lookup2 cannot be used to generate another lookup object (such as lookup3) that is associated with another principal class. Hence, a class merely with access to lookup1 cannot gain private reflective access to a desired principal class of the failed lookup3. Therefore, the system respects the module boundary between (a) a module including a class with access to lookup1 and (b) a module including a desired principal class of the failed lookup3.

In one or more embodiments, as described above, a lookup object's reflective access is defined based on (a) a principal class of the lookup object and (b) a set of access modes of the lookup object. One of the access modes is the MODULE bit, which indicates whether the lookup object has reflective access to public members of public types (exported or not) of a module including the principal class of the lookup object. A lookup object with the MODULE bit turned ON can only be generated if the principal class of the lookup object is within the caller module (for example, if the principal class of the lookup object is the caller class itself). Hence, the MODULE bit may be efficiently used to determine whether the lookup object is generated from a member of a module including the principal class of the lookup object. Further, the MODULE bit may be efficiently used to serve the dual purpose of also indicating whether the lookup object is associated with an access mode permitting teleporting with private reflective access—that is, the MODULE bit associated with a lookup object may indicate both (a) whether the lookup object may be used as a basis for generating a new lookup object associated with (i) private reflective access and (ii) a different principal class, and (b) whether the lookup object has reflective access to public members of public types (exported or not) of a module including the principal class of the lookup object.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be construed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as JAVA, C, C++, C#, RUBY, PERL, and so forth. Thus, the source code files 101 adhere to a particular set of syntactic and/or semantic rules for the associated language. For example, code written in JAVA adheres to the JAVA Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as JAVA) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the JAVA Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
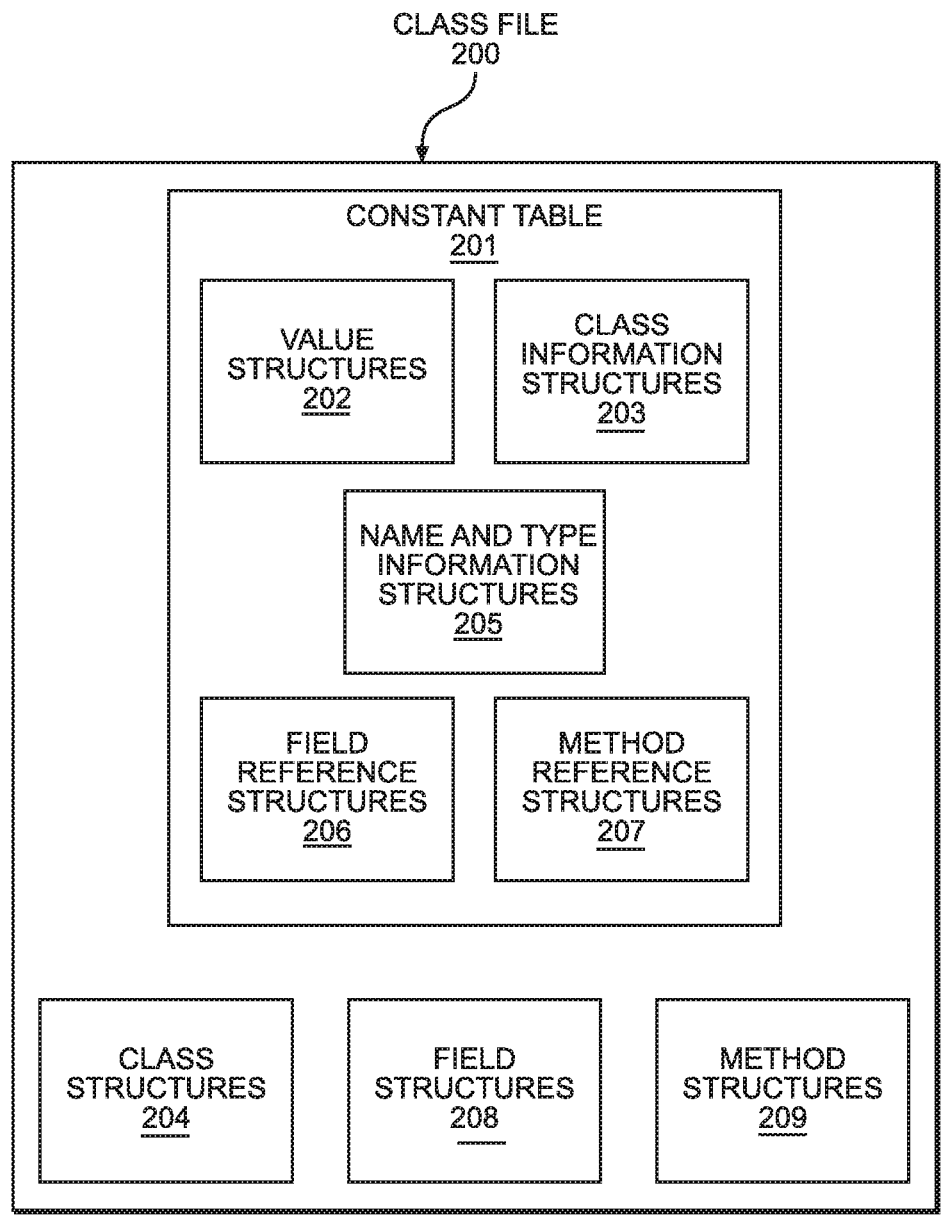
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using JAVA as an example, consider the following class:

```
class A
{
    int add12and13( ) {
        return B.addTwo(12, 13);
    }
}
```

In the above example, the JAVA method add12and13 is defined in class A, takes no parameters, and returns an integer. The body of method add2and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In JAVA, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
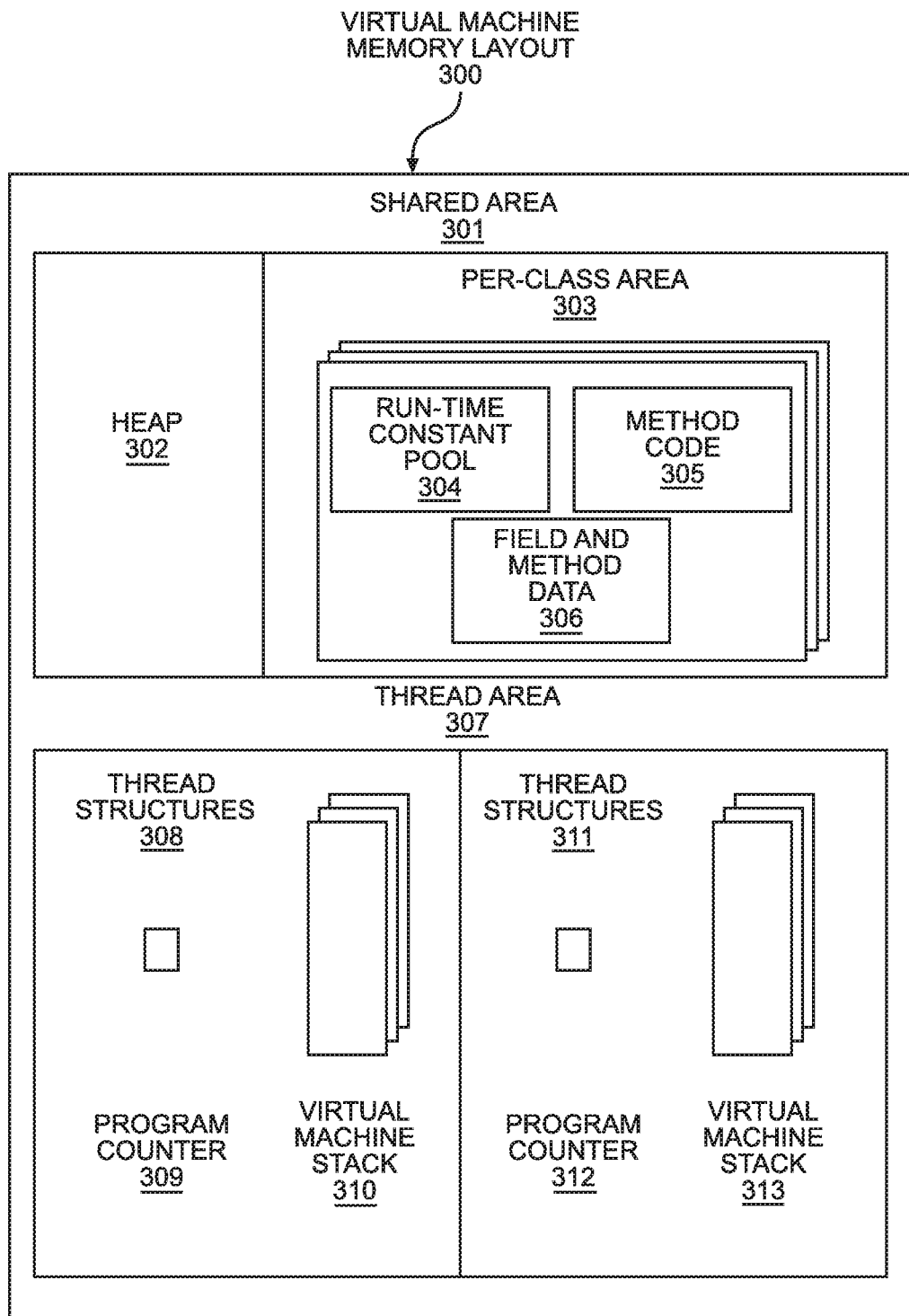
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
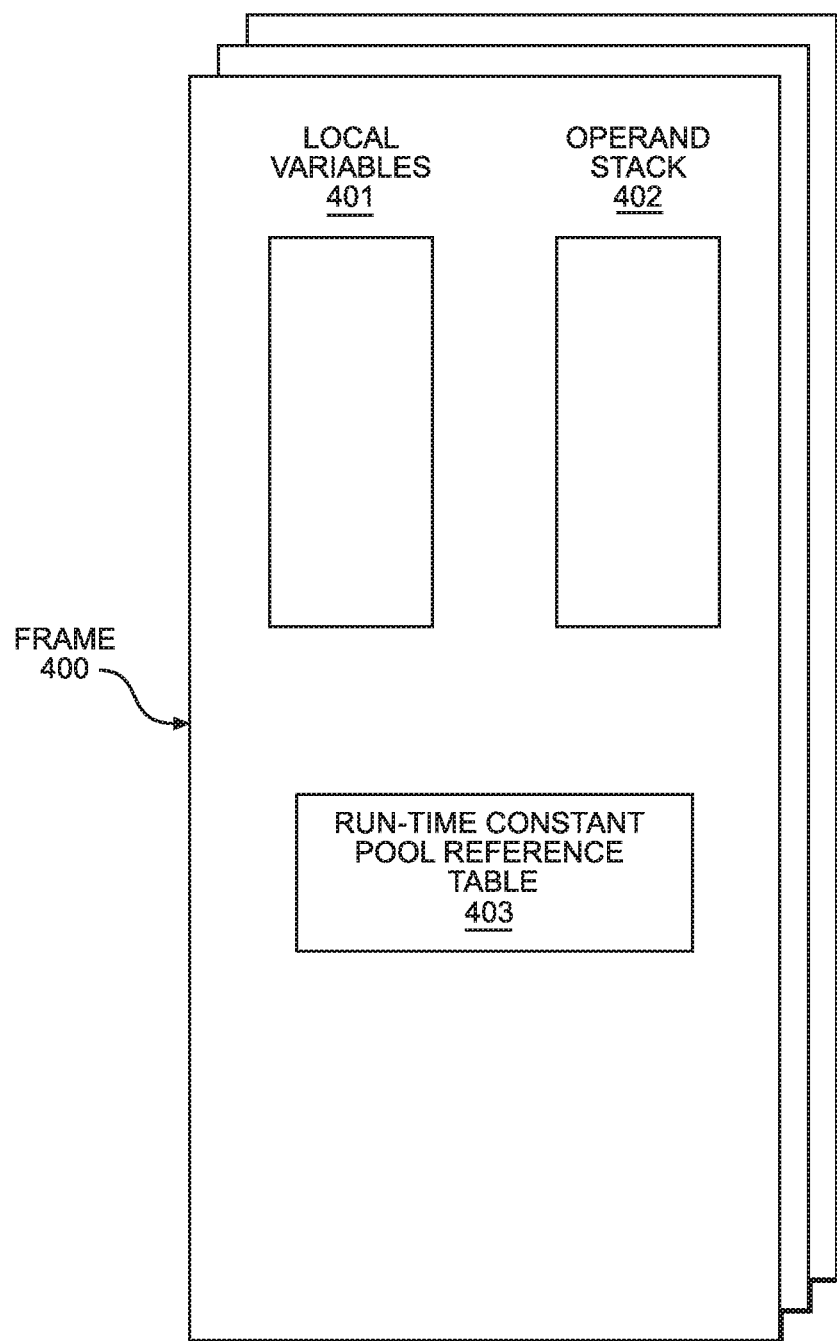
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in JAVA the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Modules

3.1 Module Declarations

In one or more embodiments, a named module is a self-describing collection of code and/or data. The code includes one or more types (such as classes and interfaces), which may be organized as a set of one or more packages. The module's self-description is expressed in the module's "module declaration." A "member" of a module may refer to a package, a type, a method, or a field in the module. A "member" of a class may refer to a method or field in the class.

A particular module's self-description, or module declaration, indicates one or more of the following:
  (a) the name (or other reference) of the particular module;
  (b) dependencies on other modules to define the universe of classes and interfaces available to the particular module's own code (see Section 4.2, entitled "Module Dependencies");
  (c) which of the particular module's packages are exported or opened in order to populate the universe of classes and interfaces available to other modules which specify a dependence on it (see Section 4.3, entitled "Exported and Opened Packages");
  (d) the services the particular module consumes; and
  (e) the services the particular module provides.

3.2 Module Dependencies

A directive or clause of a module declaration specifies the module's dependencies on other modules. As an example, the requires directive in a module declaration of Module A may specify the name of a module on which Module A depends. For example, a module declaration of Module A may include, "requires Module B," to indicate a dependence on Module B.

Module dependencies may be illustrated in a module graph. In a module graph, each module is represented by a node. A dependency between a first module and a second module is represented by an edge between a node representing the first module and a node representing the second module. The edge may also be labeled with the type of the corresponding dependency.

Figure 5:
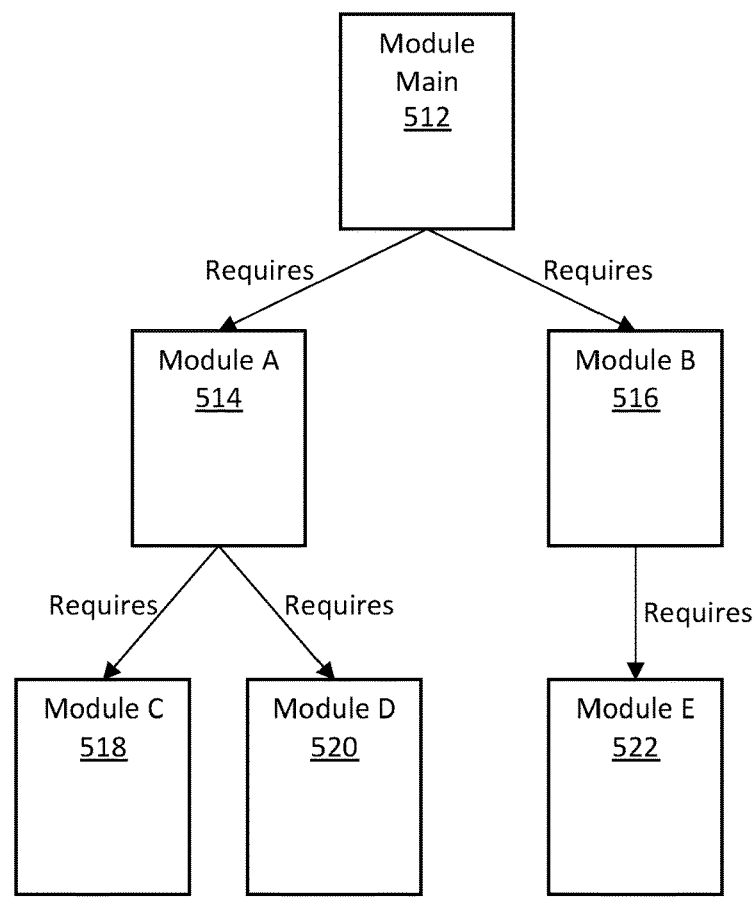
FIG. 5 illustrates an example module graph according to an embodiment.

FIG. 5 illustrates an example module graph, in accordance with one or more embodiments. A module graph 502 illustrates module dependencies corresponding to Module Main 512. Module Main 512 is used as an initial module for the module graph 502. Module Main 512 includes a type that includes a method that serves as an application's entry point. In JAVA, for example, the default entry point method is called main. In other examples, a module graph may be determined using another module as an initial module. For example, a module that is required by Module Main 512 may be used as an initial module for a module graph.

In this example, Module Main 512 is associated with the following module declaration:

```
module Main {
    requires A;
    requires B;
}
```

Module Main 512 is drawn as an initial node in the module graph 502. Since module graph 502 illustrates only module dependencies, only requires clauses are analyzed. Based on the requires clauses of Module Main 512, an edge is drawn from Module Main 512 to Module A 514. Additionally, an edge is drawn from Module Main 512 to Module B 516. Each edge is labeled "Requires," and points away from Module Main 512. The module graph 502 indicates that there is a module dependency from Module Main 512 to each of Module A 514 and Module B 516.

The module graph 502 may be expanded by recursively examining each module already identified in the module graph 502. The module declaration of Module A 514 may be examined. Based on the requires clauses of Module A 514, further nodes and edges stemming from the node representing Module A 514 may be added to the module graph 502. Similarly, the module declaration of Module B 516 may be examined. Based on the requires clauses of Module B 516, further nodes and edges stemming from the node representing Module B 516 may be added to the module graph 502.

The term "transitive closure of module dependencies" corresponding to Module Main 512 includes all module dependencies that may be identified by recursively examining each module already identified in the module graph 502. The term "a set of modules in the transitive closure of module dependencies" corresponding to Module Main 512 refers to all modules that may be identified by recursively examining each module already identified in the module graph 502 (including Module Main 512 itself). The set of modules in the transitive closure of module dependencies corresponding to Module Main 512 includes all modules represented in the module graph 502, after the module graph 502 is completed.

As described in the above example, Module Main 512 requires Module A 514 and Module B 516. Continuing the example, Module A 514 may require Module C 518 and Module D 520. Each of Module C 518 and Module D 520 do not require any other modules. Module B may require Module E 522. Module E 522 does not require any other modules. Then a set of modules in the transitive closure of module dependencies corresponding to Module Main 512 is: Module Main 512, Module A 514, Module B 516, Module C 518, Module D 520, and Module E 522.

3.3 Exported and Opened Packages

A directive or clause of a module declaration specifies which members of the module are exported or opened to other modules.

Exporting a package grants, to code in other modules, access at compile time and run time to the public and protected types in the exported package, and the public and protected members of those types. Further, exporting a package grants, to code in other modules, reflective access to those types and members.

As an example, the exports directive in a module declaration of Module A may specify the name of a package which Module A exports. For example, a module declaration of Module A may include, "exports Package C," to indicate exportation of Package C.

Opening a package grants, to code in other modules, access at run time (but not compile time) to the public and protected types in the opened package, and the public and protected members of those types. Further, opening a package grants, to code in other modules, reflective access to all types in the opened package, and all their members. Since other modules gain reflective access to even private members of an opened package, opening a package may also be referred to as granting "deep reflective access" for the package. As used herein, granting deep reflective access for a package also grants deep reflective access to each type (such as classes and interfaces) within the package.

As an example, the opens directive in a module declaration of Module A may specify the name of a package which Module A opens. For example, a module declaration of Module A may include, "opens Package C," to indicate opening of Package C.

A module may export or open a package in an unqualified manner or a qualified manner. For a qualified directive, the code that is permitted to access the package includes only code in the modules specified in a clause within the qualified directive. The specified modules are referred to as "friends" of the current module. For an unqualified directive, the code permitted to access the package includes code in any module.

As an example, a module declaration of Module A may state, "exports Package C; opens Package D to Module B." The module declaration indicates that Module A has an unqualified export for Package C. Code in any module has access at compile time and run time to the public and protected types in Package C, and the public and protected members of those types. Further, code in any module has reflective access to those types and members. Further the module declaration indicates that Module A has a qualified opens for Package D. Code in Module B has access at run time (but not compile time) to the public and protected types in Package D, and the public and protected members of those types. Further, Code in Module B has reflective access to all types in Package D, and all their members. However, code of other modules do not have such access.

3.4 Access Control

In one or more embodiments, there are at least three aspects to access control: observability, readability, and accessibility. Further descriptions of access control and/or encapsulation boundaries are included in U.S. patent application Ser. No. 14/847,800, filed Sep. 8, 2015, and U.S. patent application Ser. No. 14/847,833, filed Sep. 8, 2015; each of which is incorporated by reference in its entirety.

3.4.1 Observability

In one or more embodiments, a module is "observable" if a compiler or virtual machine (such as, JVM) is able to find the module. Observable modules include, for example, (1) named modules built into the compile-time environment and/or runtime environment 113 (which may be stored in a runtime image), (2) named modules included in module artifacts of a module path, and (3) an unnamed module associated with a class path (also referred to as a "namespace"). (Unnamed modules are further described below in Section 3.5, entitled "Unnamed Modules.") Types that are within packages of observable modules are referred to herein as "observable types."

In an embodiment, a module path is an ordered list of entries that is defined by a host system. Each entry identifies a location (such as, a URL) of one or more module artifacts and/or directories including module artifacts. Different class loaders may load modules from different module paths. As an example, a module path for a particular class loader may be defined in a -modulepath statement in a command line.

A module artifact includes class files of the types associated with the packages of a particular module. The module artifact also includes the module declaration of the particular module. The module artifact may be a compressed version of the contents. Various formats may be used to store a module artifact, including but not limited to a JAVA Archive (JAR) file format, ZIP file format, and JMOD file format. A module artifact may also be referred to herein as a "module source."

In an embodiment, a class path is an ordered list of entries defined by a host system. Each entry identifies a location (such as, a URL) of one or more types, directories including types, and/or artifacts including types. Different class loaders may load types from different class paths. As an example, a class path for a particular class loader may be defined in a -cp statement or -classpath statement in a command line, and/or a CLASSPATH environment variable of a development toolkit.

3.4.2 Readability

In one or more embodiments, a first module is "readable" to a second module if the second module depends on the first module. Conversely, a second module "reads" a first module if the second module depends on the first module. Given an initial observable module, a compiler or runtime environment 113 performs resolution to determine a module graph and/or transitive closure of the module dependencies. During resolution, the compiler or runtime environment 113 locates a first set of observable modules to fulfill the dependencies of the initial observable module. Then the compiler or runtime environment 113 locates a second set of observable modules to fulfill the dependencies of the first set of modules. The compiler or runtime environment 113 recursively fulfills the dependencies of all observable modules already identified in the module graph. The module graph and the transitive closure of module dependencies are further described above in Section 3.2, entitled "Module Dependencies."

Related to the concept of readability is "type visibility." A first type associated with a first module is "visible" to a second type associated with a second module, if the second module depends on the first module.

3.4.3 Accessibility

In one or more embodiments, a first type of a first module is "accessible" to a second type of a second module if (1) the second module reads the first module, and (2) the first module exports or opens the first type (or a package including the first type). (An additional requirement for accessibility may require that the first type is declared as being public.)

A compiler or runtime environment 113 strictly enforces the accessibility of modules. A particular type is not allowed to access another type that is not accessible to the particular type. If a type of one module references another type of another module that is not accessible, then the compiler or runtime environment 113 causes an error to be thrown. The compiler or runtime environment 113 verifies that the accessibility requirements are satisfied prior to compiling or executing the modules.

3.5 Unnamed Module

Code that is not associated with any module declarations may be referred to as "non-module code." Non-module code may be code that was written without modules in mind. For example, non-module code may be legacy code written prior to the introduction of the module system. Non-module code loaded from a class path, which is defined by the host system, may be referred to as an "unnamed module."

Since an unnamed module does not have a module declaration to specify module dependencies or exported and opened packages, the following descriptions may apply.

An unnamed module reads every observable module. However, code of an unnamed module is never visible to a named module because no requires directive can arrange for a named module to read an unnamed module. (Reflection may be used to arrange for a named module to read an unnamed module at run time.)

An unnamed module exports every package associated with that unnamed module. Additionally, an unnamed module opens every package associated with that unnamed module.

4. Reflective Access and Lookup Objects

4.1 Reflective Access

Reflective access includes the ability to generate a method handle. A method handle is a typed, directly executable reference to an underlying method, constructor, field, or similar low-level operation. In some embodiments, a method handle may include optional transformations of arguments or return values. Invoking a method handle may be referred to as "executing a reflective access operation."

Reflective access is obtained through the use of a factory object, referred to as a "lookup object." In particular, a method handle is generated using a factory method pattern based on a factory object. As an example, in JAVA, a factory object used to gain reflective access may be an object of the class MethodHandles.Lookup (also referred to as the class Lookup). As an example, a certain class C1 may include the following code to generate a lookup object lookup1:

Lookup lookup1=MethodHandles.lookup( );

The lookup object lookup1 may then be used to generate a method handle, as follows:

MethodHandle myMethodHandle=lookup1.findVirtual (refclass, methodname, methodtype);

wherein:
methodname is the name of the method associated with the method handle myMethodHandle;
methodtype is the type of the method (that is, the parameter type(s) and return type of the method);
refclass is the class from which the method is accessed.

4.2 Access Checking

4.2.1 Access Checking for Generation of Method Handles

In one or more embodiments, access checking is required for generation of method handles. Method handles do not perform access checks when they are called, but rather when they are created. Therefore, method handle access restrictions must be enforced when a method handle is created.

Generation of a method handle based on a particular lookup object is limited by the reflective access of the particular lookup object. A method handle, generated based on a particular lookup object, for a particular member (such as a method, constructor, field) is permitted only if the particular member is within the reflective access of the particular lookup object. A lookup object's reflective access is defined based on (a) a principal class of the lookup object and (b) a set of access modes of the lookup object. The access modes are interpreted with respect to the principal class, as further described below.

Figure 6:
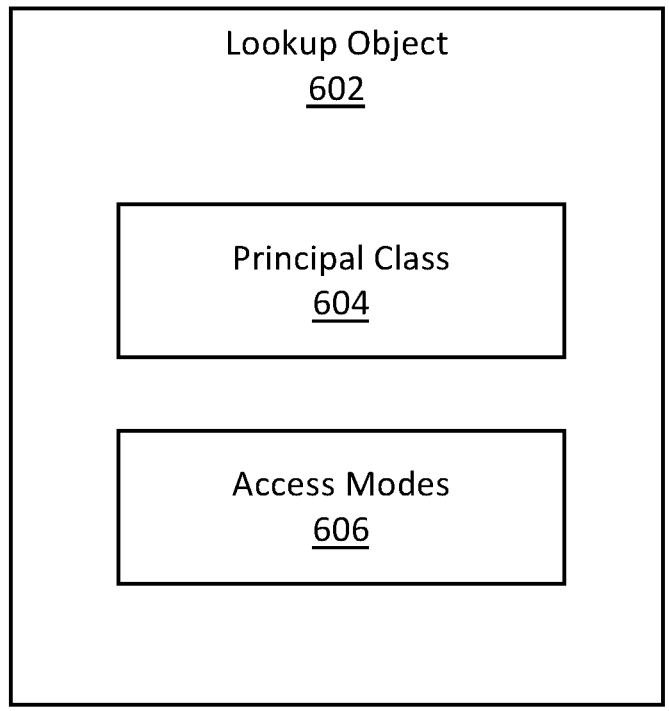
FIG. 6 is a block diagram of an example lookup object according to an embodiment.

FIG. 6 is a block diagram of an example lookup object according to an embodiment. A lookup object 602 is associated with a principal class 604 and one or more access modes 606.

In one or more embodiments, a principal class 604 of a lookup object 602 is a class that is used to define the reflective access of the lookup object 602. Unless all access modes 606 (discussed below) for the lookup object 602 are turned OFF (or otherwise not granted), the lookup object 602 has reflective access to at least a subset of members of the principal class 604.

A principal class 604 of a lookup object 602 is established at the time the lookup object 602 is generated. Referring to the above example code, the method MethodHandles.lookup( ) generates a lookup object whose principal class is the caller class (which is C1 in the example).

As another example, the method MethodHandles.privateLookupin( ) generates a lookup object whose principal class may be a target class different than the caller class. The target class is specified as an argument into the method MethodHandles.privateLookupIn( ).

The principal class 604 of a lookup object 602 is not necessarily the class that defines the lookup object 602. As described above, a principal class 604 of a lookup object 602 is a class that is used to define the reflective access of the lookup object 602. In contrast, the class that defines the lookup object 602 is a class that defines the fields, methods, and/or other attributes of the lookup object 602. As an example, the method MethodHandles.lookup( ) generates a lookup object whose principal class is the caller class. While the principal class is the caller class, the class defining the lookup object is Lookup. Hence, the principal class of the lookup object and the class defining the lookup object are different.

In one or more embodiments, a set of access modes 606 of a lookup object 602 specifies, with respect to the principal class 604, which members are accessible to the lookup object 602. As an example, access modes may include: PUBLIC, PRIVATE, PROTECTED, PACKAGE, MODULE. Each access mode may be turned ON or OFF, based on a bit representing the respective access mode. In particular, if a PUBLIC bit is set, then the lookup object has reflective access to public members of exported and public types of (a) a module including the principal class and (b) any other modules that the module of the principal class reads. If a PRIVATE bit is set, then the lookup object has reflective access to private members of the principal class. The lookup object may be referred to as having "private reflective access" to members of the principal class. If the MODULE bit and the PUBLIC bit are set, then the lookup object has reflective access to public members of public types (whether exported or not) of at least the module including the principal class; the lookup object may also have reflective access to public members of public types in packages that other modules export to at least the module including the principal class, given that the module including the principal class reads the other modules. Other embodiments may provide different types of access modes, and/or may define each access mode differently.

A set of access modes of a lookup object are established at the time the lookup object is generated. Thereafter, access modes of the object may only be dropped, not added.

4.2.2 Access Checking for Generation of a Lookup Object

In one or more embodiments, access checking is required for generation of a lookup object (such as a lookup object in JAVA) having certain access modes that define the scope of the lookup object's reflective access.

A particular class may generate a lookup object whose principal class is the particular class itself, without further access checks. The particular class may grant to the lookup object reflective access to members that are accessible to the particular class itself, without further access checks. As an example, a lookup object whose principal class is the caller class may have reflective access to private members of the principal class. The lookup object may also have reflective access to public members of other classes within the same module as the principal class. The lookup object may, for example, have the following access modes set to ON: PRIVATE, PACKAGE, MODULE, PUBLIC.

A particular class may generate a lookup object whose principal class is a target class different than the caller class, only if certain access checks are satisfied. An existing lookup object is provided as a basis for satisfying access check requirements for generating the new lookup object.

The particular class may invoke a method (such as MethodHandle.privateLookupIn( ) in JAVA) to generate a new lookup object (a) whose principal class that may be different than the caller class and (b) has private reflective access. The method may accept two parameters: a target class, and an existing lookup object. The target class is to become the principal class of the new lookup object. The existing lookup object is provided as a basis for satisfying access check requirements for generating the new lookup object. The access check requirements may include requiring that an access mode of the existing lookup object allows for teleporting with private reflective access. "Teleporting with private reflective access" refers to generating a new lookup object associated with (i) private reflective access and (ii) a principal class (referred to as a "target class") different than the principal class of the existing lookup object. Further, if the target class is in a module different than the module including the principal class of the existing lookup object, the access check requirements for generating the new lookup object also include requiring that:

(a) the module m1 including the principal class of the existing lookup object reads the module m2 including the target class; and (b) m2 opens the package including the target class to at least m1.

If the access check requirements are satisfied, then the new lookup object is generated. The new lookup object would have reflective access to private members of the target class, even if the target class is in a module different than the module including the principal class of the existing lookup object.

In one or more embodiments, a same bit or field of a lookup object indicates (a) whether the lookup object has reflective access to public members of public types (whether exported or not) of a module including the principal class and (b) whether the lookup object may be used as a basis for teleporting with private reflective access.

The bit or field indicating the above access information may be, for example, a MODULE bit associated with the lookup object. If the MODULE bit is set, then (a) the lookup object has reflective access to public members of public types (whether exported or not) of at least the module including the principal class and (b) the lookup object may be used as a basis for teleporting with private reflective access. Conversely, if the MODULE bit is not set, then (a) the lookup object does not have reflective access to members of at least non-exported types of the module including the principal class and (b) the lookup object cannot be used as a basis for teleporting with private reflective access.

5. Generating a New Lookup Object Based on an Existing Lookup Object

Figure 7A:
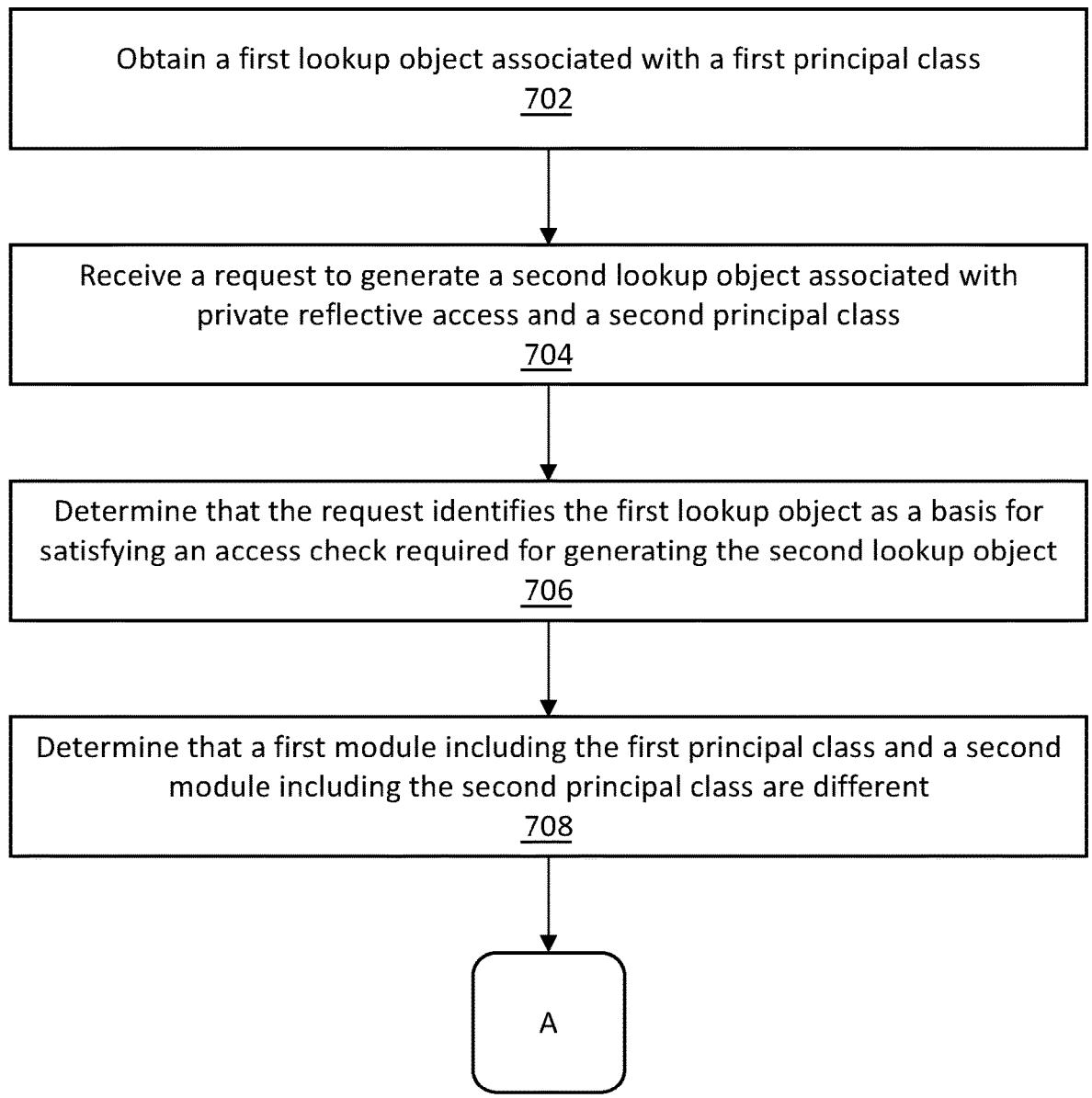
FIGS. 7A-7B illustrate an example set of operations for generating a new lookup object based on an existing lookup object according to an embodiment.
Figure 7B:
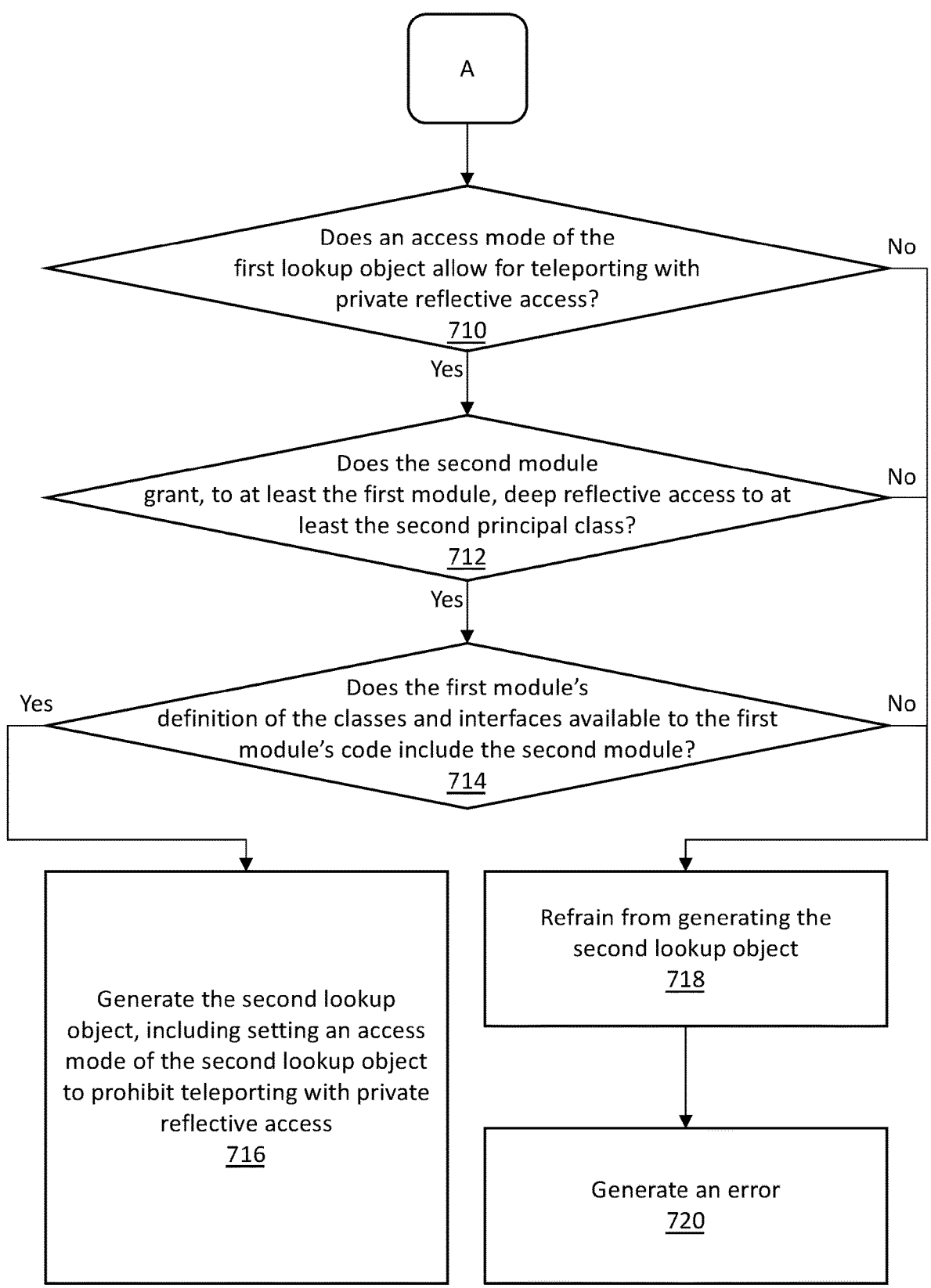

FIGS. 7A-7B illustrate an example set of operations for generating a new lookup object based on an existing lookup object, in accordance with one or more embodiments. One or more operations illustrated in FIGS. 7A-7B may be modified, rearranged, or omitted all together. Accordingly, the particular sequence of operations illustrated in FIGS. 7A-7B should not be construed as limiting the scope of one or more embodiments.

One or more embodiments include obtaining a first lookup object associated with a first principal class (Operation 702). The first lookup object is associated with a first principal class. The first lookup object has reflective access to at least a subset of members of the first principal class. The first lookup object may have private reflective access to members of the first principal class.

In an embodiment, the first lookup object is obtained by invoking a method to generate the first lookup object. As an example, a method (such as MethodHandle.lookup( ) in JAVA) may be invoked to generate a lookup object whose principal class is the caller class. In another embodiment, the first lookup object is obtained by receiving the first lookup object from another class.

One or more embodiments include receiving a request to generate a second lookup object associated with private reflective access and a second principal class (Operation 704). The second principal class is different than the first principal class. The second lookup object would have reflective access to at least a subset of private members of the second principal class. The second lookup object may have, for example, its PRIVATE bit turned ON to indicate the second lookup object's private reflective access.

The request to generate the second lookup object is received as an invocation to a method to generate the second lookup object. An input to the method specifies the target class. As an example, a method (such as MethodHandle.privateLookupIn( ) in JAVA) may be invoked to generate a lookup object whose principal class is any class specified as a target class.

One or more embodiments include determining that the request identifies the first lookup object as a basis for satisfying an access check required for generating the second lookup object (Operation 706). As described above, the request to generate the second lookup object is received as an invocation to a method to generate the second lookup object. An input to the method may identify the first lookup object as a basis for satisfying an access check required for generating the second lookup object.

One or more embodiments include determining that a first module including the first principal class and a second module including the second principal class are different (Operation 708). The first module including the first principal class is identified. The second module including the second principal class is identified. The first module and the second module are determined as being different. The first module and the second module may each have its own module declaration.

One or more embodiments include determining whether an access mode of the first lookup object allows for teleporting with private reflective access (Operation 710). Determining whether an access mode of the first lookup object allows for teleporting with private reflective access includes determining whether the access mode allows for generating a new lookup object associated with (i) private reflective access and (ii) a principal class different than the first principal class.

The access mode of the first lookup object is determined. The access mode may be determined by identifying a value of a particular bit or field (such as a MODULE bit in JAVA) associated with the first lookup object. The access mode indicates whether teleporting with private reflective access is permitted.

In some embodiments, the access mode of the first lookup object that indicates permission for teleporting with private reflective access also indicates additional information. The access mode of the first lookup object may also indicate whether the first lookup object has reflective access to public members of public types in the first module, regardless of whether those types are exported by the first module. As an example, a MODULE bit of the first lookup object may indicate both (a) permission for teleporting with private reflective access and (b) whether the first lookup object has reflective access to public members of public types in the first module. If the MODULE bit is set (equal to 1), then teleporting with private reflective access is permitted, and reflective access to public members of public types in the first module is permitted. Conversely, if the MODULE bit is not set (equal to 0), then teleporting with private reflective access is not permitted, and reflective access to members of at least non-exported types in the first module is not permitted.

One or more embodiments include determining whether the second module grants, to at least the first module, deep reflective access to at least the second principal class (Operation 712). Determining whether the second module grants, to at least the first module, deep reflective access to at least the second principal class may include determining whether the second module grants reflective access to private members of the second principal class. Additionally or alternatively, determining whether the second module grants, to at least the first module, deep reflective access to at least the second principal class may include determining whether the second module grants reflective access to the second principal class, even if the second principal class is private.

In an embodiment, determining whether the second module grants, to at least the first module, deep reflective access to at least the second principal class is performed by determining whether the second module opens at least the second principal class to the first module.

The second module may open the second principal class to the first module through a module declaration. The module declaration of the second module is analyzed to determine whether the module declaration includes a directive (such as an opens directive in JAVA) that opens at least the second principal class. The module declaration of the second module is also analyzed to determine whether the directive is unqualified or qualified.

If the module declaration of the second module includes an unqualified directive that opens a package including the second principal class, then the second module opens at least the second principal class to the first module. Alternatively, if the module declaration of the second module includes a qualified directive that opens a package including the second principal class, and the qualified directive specifies opening the package to the first module, then the second module opens at least the second principal class to the first module.

Additionally or alternatively, the second module may open the second principal class to the first module through a command line statement. If a command line statement includes an unqualified directive that opens a package including the second principal class, then the second module opens at least the second principal class to the first module. Alternatively, if a command line statement includes a qualified directive that opens a package including the second principal class, and the qualified directive specifies opening the package to the first module, then the second module opens at least the second principal class to the first module.

If the module declaration of the second module does not indicate the second module opens the second principal class to the first module, and no command line statement indicates that the second module opens the second principal class to the first module, then the second module does not open the second principal class to the first module.

One or more embodiments include determining whether the first module's definition of the classes and interfaces available to the first module's code includes the second module (Operation 714). Determining whether the first module's definition of the classes and interfaces available to the first module's code includes the second module is performed by determining whether the first module reads the second module.

The first module may read the second module through a module declaration. The module declaration of the first module is analyzed to determine whether the module declaration includes a directive that reads (such as a requires directive in JAVA) the second module. If the module declaration of the first module includes a directive that reads the second module, then the first module reads the second module. Otherwise, the first module does not read the second module.

If one or more of the access check requirements of Operations 710-714 are not satisfied, then one or more embodiments include refraining from generating the second lookup object (Operation 718). An error may be generated to indicate that an attempt to generate a lookup object associated with the second principal class has failed (Operation 720).

However, if the access check requirements of Operations 710-714 are satisfied, then one or more embodiments include generating the second lookup object (Operation 716). Generating the second lookup object includes dropping an access mode of the second lookup object that allows for teleporting with private reflective access.

In some embodiments, the access mode of the second lookup object that indicates permission for teleporting with private reflective access also indicates additional information. The access mode of the second lookup object may also indicate whether the second lookup object has reflective access to public members of public types in the second module, regardless of whether those types are exported by the second module. As an example, a MODULE bit of the second lookup object may indicate both (a) permission for teleporting with private reflective access and (b) whether the second lookup object has reflective access to public members of public types in the second module. Therefore, setting the access mode of the second lookup object to disallow teleporting with private reflective access also thereby disallows the second lookup object from having reflective access to members of at least non-exported types in the second module. As an example, a MODULE bit of the second lookup object may be turned OFF.

As described above, the request for generating the second lookup object includes requesting that the second lookup object be associated with private reflective access. Responsive to the request, an access mode of the second lookup object is set to permit reflective access to private members of the second principal class. As an example, a PRIVATE bit of the second lookup object may be turned ON.

In one or more embodiments, based on the operations of FIGS. 7A-7B, reflective access is confined based on module boundaries. As described, generating the second lookup object includes dropping an access mode that allows teleporting with private reflective access. Since the access mode is dropped, an attempt to generate a new lookup object (such as a third lookup object) associated with private reflective access and a new principal class (such as a third principal class in a third module) based on the second lookup object would be denied. Hence, where the third module does not grant deep reflective access to the first module, a class merely with access to the first lookup object cannot circumvent the access barrier by using the first lookup object to generate the second lookup object and then using the second lookup object to generate the third lookup object. Without the third lookup object, the class cannot gain private reflective access to the third principal class. Therefore, the module boundary between the first module and the third module is respected.

6. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 8:
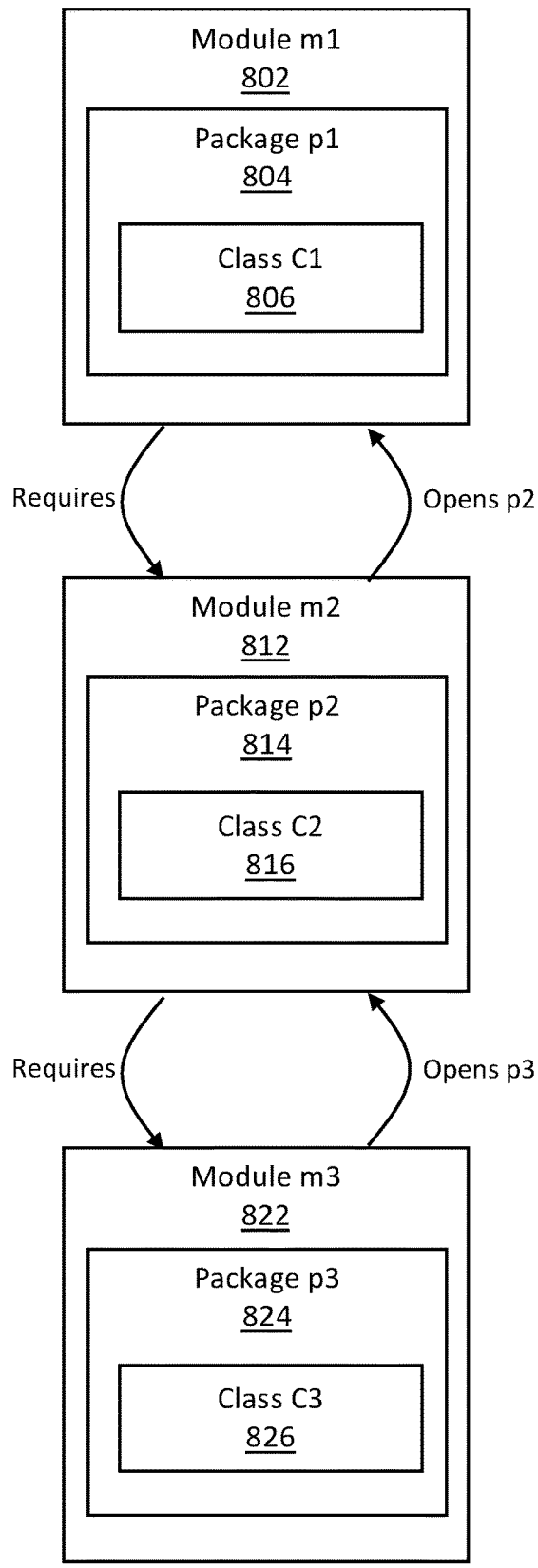
FIG. 8 illustrates an example module graph according to an embodiment.

FIG. 8 illustrates an example module graph according to an embodiment.

As illustrated, module m1 802 includes package p1 804; package p1 804 includes class C1 806. Module m2 812 includes package p2 814; package p2 814 includes class C2 816. Module m3 822 includes package p3 824; package p3 824 includes class C3 826.

Additionally, m1 is associated with directive(s) indicating m1 requires m2; m2 is associated with directive(s) indicating (a) m2 requires m3, and (b) m2 opens p2 to m1; and m3 is associated with directive(s) indicating m3 opens p3 to m2. Note that m3 does not open p3 to m1. Since m2 opens p2 to m1, m2 may be referred to as granting "deep reflective access" to m1 for classes in p2. Since m3 opens p3 to m2, m3 may be referred to as granting "deep reflective access" to m2 for classes in p3.

Figure 9:
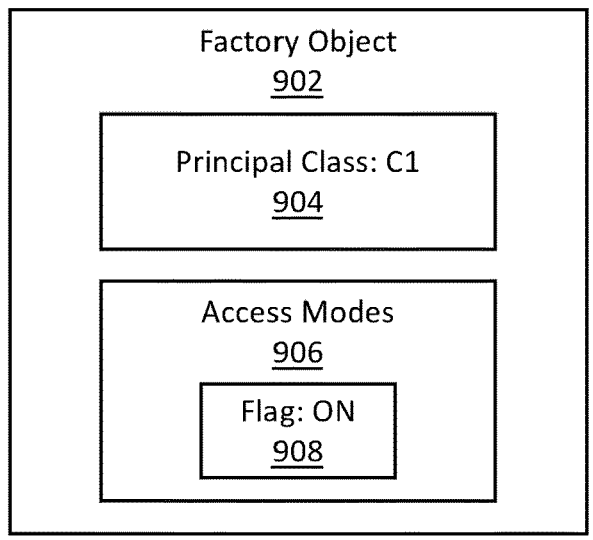
FIG. 9 illustrates an example of illegitimate reflective access in violation of module boundaries.
Figure 9:
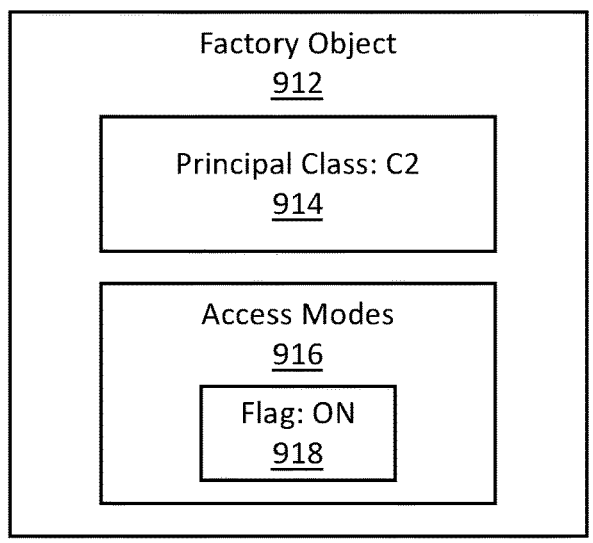
Figure 9:
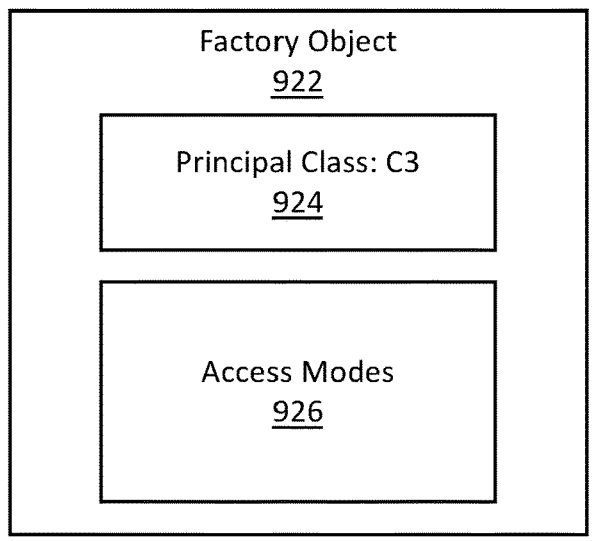

FIG. 9 illustrates an example of illegitimate reflective access in violation of module boundaries. FIG. 9 refers to the modules and members thereof, illustrated in FIG. 8, using the same names and references.

Class C1 806, in module m1 802, attempts to generate a factory object 902 having (a) a principal class 904 that is C1 itself and (b) access modes 906 that include private reflective access. Whether the caller class is the same as the desired principal class is determined. Since the caller class (C1) is the same as the principal class 904 (C1), the generation of factory object 902 is permitted.

Moreover, since the caller class (C1) is the same as the principal class 904 (C1), access modes 906 of factory object 902 are set to allow teleporting with private reflective access. Flag 908, included in access modes 906, is thus set to ON, to allow teleporting with private reflective access.

Next, class C1 806 attempts to generate a factory object 912 having (a) a principal class 914 that is class C2 816, which is in module m2 812, and (b) access modes 916 that include private reflective access. Factory object 902 is provided as a basis for satisfying access check requirements for generating factory object 912. At least two criteria, related to factory object 902, are checked. First, whether m2 opens, to a module including the principal class of factory object 902, a package including C2 is determined. As stated above, the principal class 904 of factory object 902 is C1. Referring back to FIG. 8, m2 indeed opens, to the module m1 802 including C1, the package p2 814 including C2. In other words, m2 grants deep reflective access to m1 for C2. Second, whether factory object 902 is associated with access modes 906 allowing teleporting with private reflective access is determined. As stated above, flag 908 of factory object 902 is set to ON. Based at least on satisfying the above criteria, the generation of factory object 912 is permitted. (A third criteria that may be checked is determining whether the module m1 including the principal class C1 of factory object 902 reads the module m2 including the desired principal class C2 of factory object 912. Referring back to FIG. 8, m1 indeed "requires" m2. Therefore, the third criteria is also satisfied.)

If there were no requirement to drop the flag allowing teleporting with private reflective access, then access modes 916 of factory object 912 would include setting flag 918 to ON. Setting flag 918 to ON indicates that teleporting with private reflective access is allowed.

Next, class C1 806 attempts to generate a factory object 922 having (a) a principal class 924 that is class C3 826, which is in module m3 822, and (b) access modes 926 that include private reflective access. Factory object 912 is provided as a basis for satisfying access check requirements for generating factory object 922. At least two criteria, related to factory object 912, are checked. First, whether m3 opens, to a module including the principal class of factory object 912, a package including C3 is determined. As stated above, the principal class of factory object 912 is C2. Referring back to FIG. 8, m3 indeed opens, to the module m2 812 including C2, the package p3 824 including C3. In other words, m3 grants deep reflective access to m2 for C3. Second, whether factory object 912 is associated with access modes 916 allowing teleporting with private reflective access is determined. As stated above, flag 918 of factory object 912 is set to ON. Based at least on satisfying the above criteria, the generation of factory object 922 is permitted.

Now, module m1 802 has generated factory object 922, which has private reflective access to class C3 in module m3 822. Module m1 802 may thereby use factory object 922 to generate method handles to private members of C3. However, referring to FIG. 8, m3 does not grant deep reflective access to m1 for C3. Therefore, illegitimate reflective access to class C3, in violation of module boundaries, has been allowed.

Figure 10:
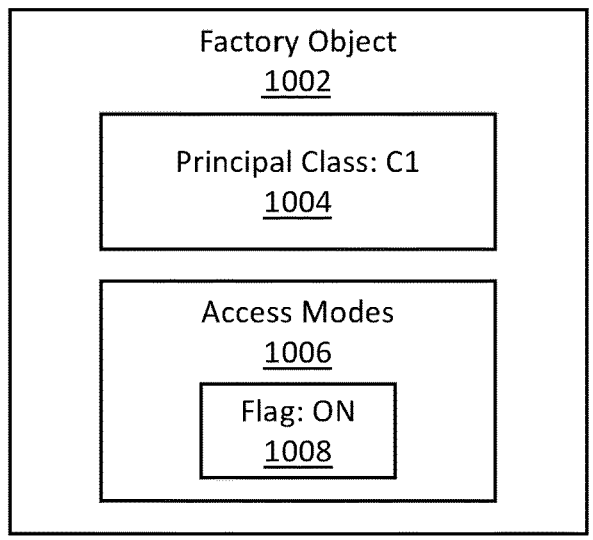
FIG. 10 illustrates an example of legitimate reflective access based on module boundaries according to an embodiment.
Figure 10:
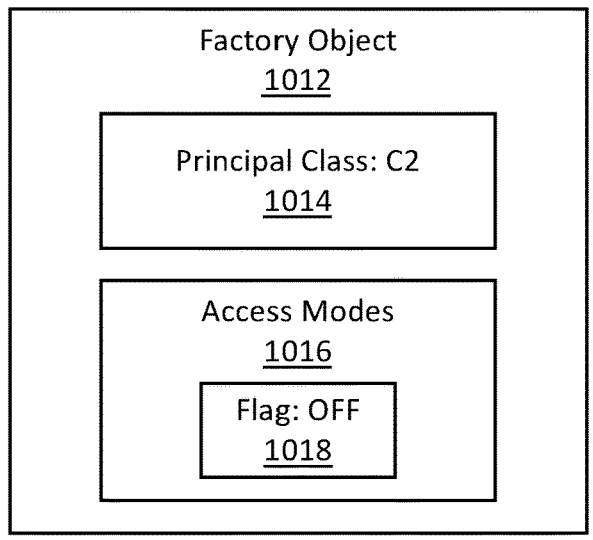
Figure 10:
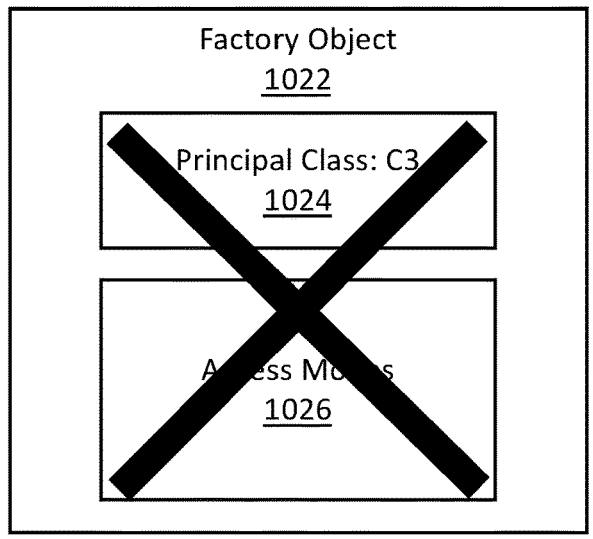

In contrast, FIG. 10 illustrates an example of legitimate reflective access based on module boundaries according to an embodiment. FIG. 10 refers to the modules and members thereof, illustrated in FIG. 8, using the same names and references.

Same as in FIG. 9, Class C1 806, in module m1 802, attempts to generate a factory object 1002 having (a) a principal class 1004 that is C1 itself and (b) access modes 1006 that include private reflective access. Whether the caller class is the same as the desired principal class is determined. Since the caller class (C1) is the same as the principal class 1004 (C1), the generation of factory object 1002 is permitted.

Moreover, since the caller class (C1) is the same as the principal class 904 (C1), access modes 1006 of factory object 1002 are set to allow teleporting with private reflective access. Flag 1008, included in access modes 1006, is thus set to ON, to allow teleporting with private reflective access.

Next, same as in FIG. 9, class C1 806 attempts to generate a factory object 1012 having (a) a principal class 1014 that is class C2 816, which is in module m2 812, and (b) access modes 1016 that include private reflective access. Factory object 1002 is provided as a basis for satisfying access check requirements for generating factory object 1012. At least two criteria, related to factory object 1002, are checked. First, whether m2 opens, to a module including the principal class of factory object 1002, a package including C2 is determined. As stated above, the principal class 1004 of factory object 1002 is C1. Referring back to FIG. 8, m2 indeed opens, to the module m1 802 including C1, the package p2 814 including C2. In other words, m2 grants deep reflective access to m1 for C2. Second, whether factory object 1002 is associated with access modes 1006 allowing teleporting with private reflective access is determined. As stated above, flag 1008 of factory object 1002 is set to ON. Based at least on satisfying the above criteria, the generation of factory object 1012 is permitted.

Now, rather than carrying over the flag allowing teleporting with private reflective access as in FIG. 9, a check is performed prior to setting flag 1018 of factory object 1012. The check may include determining whether (a) the principal class of a factory object provided as a basis for satisfying access check requirements of factory object 1012, and (b) the principal class 1014 for factory object 1012, are the same. Additionally or alternatively, the check may include determining whether a same module includes (a) the principal class of a factory object provided as a basis for satisfying access check requirements of factory object 1012 and (b) the principal class 1014 for factory object 1012. If the check is not satisfied, then the flag allowing teleporting with private reflective access is dropped. Conversely, if the check is satisfied, then the flag allowing teleporting with private reflective access is retained.

Here, principal class 1004 of factory object 1002 provided as a basis for satisfying access check requirements of factory object 1012 is C1. Principal class 1014 for factory object 1012 is C2. Since the two principal classes C1 and C2 are not the same, the check is not satisfied. The flag allowing teleporting is dropped for factory object 1012 is dropped.

Additionally or alternatively, a module including the principal class C1 of factory object 1002 provided as a basis for satisfying access check requirements of factory object 1012 is m1. A module including the principal class C2 of factory object 1012 is m2. Since the two modules m1 and m2 are different, the check is not satisfied. The flag allowing teleporting is dropped for factory object 1012 is dropped.

Therefore, access modes 1016 of factory object 1012 are set such that flag 1018 is set to OFF.

Next, class C1 806 attempts to generate a factory object 1022 having (a) a principal class 1024 that is class C3 826, which is in module m3 822, and (b) access modes 1026 that include private reflective access. Factory object 1012 is provided as a basis for satisfying access check requirements for generating factory object 1022. At least two criteria, related to factory object 1012, are checked. First, whether m3 opens, to a module including the principal class of factory object 1012, a package including C3 is determined. As stated above, the principal class of factory object 1012 is C2. Referring back to FIG. 8, m3 indeed opens, to the module m2 812 including C2, the package p3 824 including C3. In other words, m3 grants deep reflective access to m2 for C3. Second, whether factory object 1012 is associated with access modes 1016 allowing teleporting with private reflective access is determined. As stated above, flag 1018 of factory object 1012 is set to OFF. Since the latter criteria is not satisfied, the generation of factory object 1022 is not permitted.

Hence, module m1 802 does not have access to a factory object 1022 that has private reflective access to class C3 in module m3 822. Referring to FIG. 8, m3 does not grant deep reflective access to m1 for C3. Therefore, reflective access to class C3 has been confined based on module boundaries, as desired.

In one or more embodiments, the access modes of a factory object (such as factory object 1012) includes several bits. A PRIVATE bit indicates whether the factory object has reflective access to at least private members of the principal class of the factory object (also referred to as, "private reflective access to the principal class of the factory object"). A MODULE bit indicates whether the factory object has reflective access to at least public members of public classes in a package within the module including the principal class of the factory object (regardless of whether the package has been exported). The MODULE bit is also used for the dual purpose of indicating whether teleporting with private reflective access is allowed. Hence, if the MODULE bit is ON, then (a) the factory object has reflective access to at least public members of public classes of a package within the module including the principal class of the factory object (regardless of whether the package has been exported) and (b) teleporting with private reflective access is allowed. If the MODULE bit is OFF, then (a) the factory object does not have reflective access to at least members of unexported packages within the module including the principal class of the factory object and (b) teleporting with private reflective access is not allowed.

Using factory object 1012 as an example, factory object 1012 is associated with access modes 1016 that include (a) private reflective access and (b) flag 1018 indicating that teleporting with private reflective access is not permitted, as described above. The PRIVATE bit of factory object 1012 is thus set to ON to indicate private reflective access is permitted. The MODULE bit of factory object 1012 is thus set to OFF to indicate that teleporting with private reflective access is not permitted.

Figure 11:
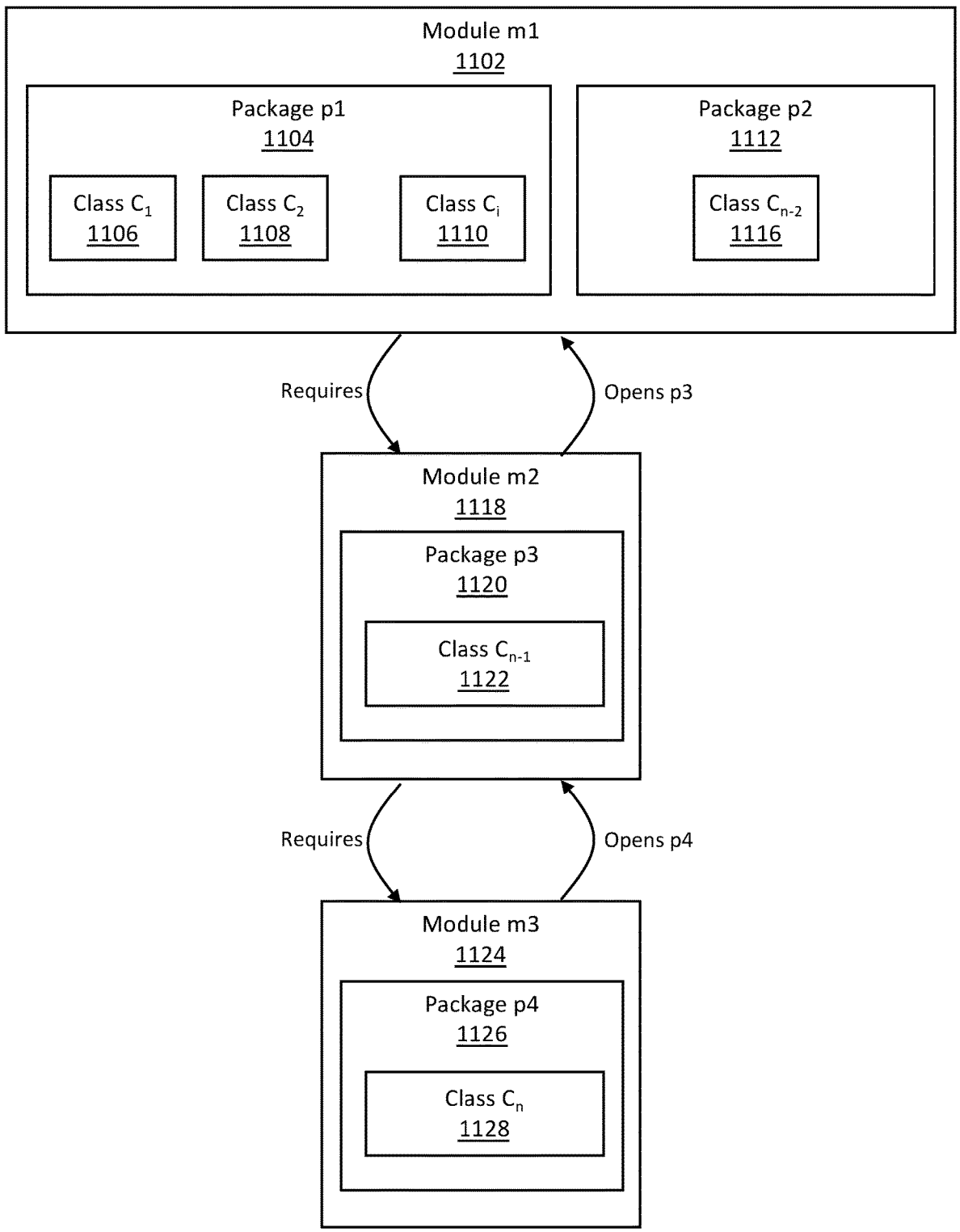
FIG. 11 illustrates an example module graph according to an embodiment.

FIG. 11 illustrates an example module graph according to an embodiment.

As illustrated, module m1 1102 includes package p1 1104 and package p2 1112. Package p1 1104 includes class $C_1$ 1106, class $C_2$ 1108, . . . , class $C_i$ 1110. Package p2 1112 includes class $C_{n-2}$ 1116. Module m2 1118 includes package p3 1120. Package p3 1120 includes class $C_{n-1}$ 1122. Module m3 1124 includes package p4 1126. Package p4 1126 includes class $C_n$ 1128.

Additionally, m1 is associated with directive(s) indicating m1 requires m2; m2 is associated with directive(s) indicating (a) m2 requires m3, and (b) m2 opens p3 to m1; and m3 is associated with directive(s) indicating m3 opens p4 to m2. Note that m3 does not open p4 to m1. Since m2 opens p3 to m1, m2 may be referred to as granting "deep reflective access" to m1 for classes in p3. Since m3 opens p4 to m2, m3 may be referred to as granting "deep reflective access" to m2 for classes in p4.

Class $C_1$ attempts to generate a first factory object having (a) $C_1$ as the principal class and (b) private reflective access. Since the caller class ($C_1$) and the principal class ($C_1$) are the same, the first factory object is successfully generated.

Moreover, since the caller class ($C_1$) and the principal class ($C_1$) are the same, the first factory object is associated with a flag allowing teleporting with private reflective access. Therefore, the PRIVATE bit and the MODULE bit of the first factory object are set to ON.

Next, class $C_1$ attempts to generate a second factory object having (a) $C_2$ as the principal class and (b) private reflective access. The first factory object is provided as a basis for satisfying access check requirements for the second factory object. At least two criteria are checked with respect to the first factory object. First, whether a module including the principal class of the first factory object has deep reflective access to the module including the desired principal class of the second factory object is determined. The same module m1 is determined as including the principal class $C_1$ of the first factory object and the desired principal class $C_2$ of the second factory object. Therefore allowing deep reflective access observes module boundaries. Second, whether the first factory object is associated with access modes allowing teleporting with private reflective access is determined. As stated above, the MODULE bit of the first factory object is ON. Based at least on satisfying the above criteria, the generation of the second factory object is permitted.

Moreover, since the same module m1 includes the principal class $C_1$ of the first factory object and the principal class $C_2$ of the second factory object, the flag allowing teleporting with private reflective access is carried over from the first factory object to the second factory object. Therefore, the PRIVATE bit and the MODULE bit of the second factory object are set to ON.

Next, class $C_1$ attempts to generate a third factory object having (a) $C_i$ as the principal class and (b) private reflective access. The second factory object is provided as a basis for satisfying access check requirements for the third factory object. At least the same two criteria described above are checked with respect to the second factory object. The same module m1 is determined as including the principal class $C_2$ of the second factory object and the desired principal class $C_1$ of the third factory object. Also, the MODULE bit of the second factory object is ON. Therefore, following the same logic described above for the generation of the second factory object, the third factory object is successfully generated, and the PRIVATE bit and the MODULE bit of the third factory object are set to ON.

Next, class $C_1$ attempts to generate a fourth factory object having (a) $C_{n-2}$ as the principal class and (b) private reflective access. The third factory object is provided as a basis for satisfying access check requirements for the fourth factory object. At least the same two criteria described above are checked with respect to the third factory object. The same module m1 is determined as including the principal class $C_i$ of the third factory object and the desired principal class $C_{n-2}$ of the fourth factory object. Also, the MODULE bit of the third factory object is ON. Despite $C_i$ and $C_{n-2}$ being in different packages (p1 and p2, respectively), the same logic described above for the generation of the second factory object applies. Therefore, the fourth factory object is successfully generated, and the PRIVATE bit and the MODULE bit of the fourth factory object are set to ON.

Next, class $C_1$ attempts to generate a fifth factory object having (a) $C_{n-1}$ as the principal class and (b) private reflective access. The fourth factory object is provided as a basis for satisfying access check requirements for the fifth factory object. At least the same two criteria described above are checked with respect to the fourth factory object. First, whether a module including the principal class of the first factory object has deep reflective access to the module including the desired principal class of the second factory object is determined. Different modules, m1 and m2 respectively, are determined as including the principal class $C_{n-2}$ of the fourth factory object and the desired principal class $C_{n-1}$ of the fifth factory object. Hence, whether m2 opens a package including $C_{n-1}$ to m1 is determined. The package including $C_{n-1}$ is p3. As illustrated, m2 indeed opens p3 to m1. In other words, m2 grants deep reflective access to m1 for C2. Second, whether the fourth factory object is associated with access modes allowing teleporting with private reflective access is determined. As stated above, the MODULE bit of the fourth factory object is ON. Based at least on satisfying the above criteria, the generation of the fifth factory object is permitted. (A third criteria that may be checked is determining whether the module m1 including the principal class $C_{n-2}$ of the fourth factory object reads the module m2 including the desired principal class $C_{n-1}$ of the fifth factory object. As illustrated, m1 indeed "requires" m2. Therefore, the third criteria is also satisfied.)

A check is performed to determine whether to set the MODULE bit of the fifth factory object to ON or OFF. The check includes determining whether a same module includes (a) the principal class $C_{n-2}$ of the fourth factory object (which was provided as a basis for satisfying access check requirements of the fifth factory object) and (b) the principal class $C_{n-1}$ for the fifth factory object. Different modules, m1 and m2 respectively, include (a) the principal class $C_{n-2}$ of the fourth factory object and (b) the principal class $C_{n-1}$ for the fifth factory object. Since the check is not satisfied, the flag allowing teleporting with private reflective access is dropped. Therefore, the PRIVATE bit of the fifth factory object is set to ON, and the MODULE bit of the fifth factory object is set to OFF.

Next, class $C_1$ attempts to generate a sixth factory object having (a) $C_n$ as the principal class and (b) private reflective access. The fifth factory object is provided as a basis for satisfying access check requirements for the sixth factory object.

At least the same two criteria described above are checked with respect to the fourth factory object. First, whether a module including the principal class of the first factory object has deep reflective access to the module including the desired principal class of the second factory object is determined. Different modules, m2 and m3 respectively, are determined as including the principal class $C_{n-1}$ of the fifth factory object and the desired principal class $C_n$ of the sixth factory object. Hence, whether m3 opens a package including $C_n$ to m2 is determined. The package including $C_n$ is p4. As illustrated, m3 indeed opens p4 to m2. In other words, m3 grants deep reflective access to m2 for $C_n$. Second, whether the fifth factory object is associated with access modes allowing teleporting with private reflective access is determined. As stated above, the MODULE bit of the fifth factory object is OFF. Since the latter criteria is not satisfied, the generation of the sixth factory object is not permitted.

As illustrated in the above example, a chain of factory objects may be generated, one factory object being generated on the basis of another factory object. The chain may be long and complex. If no restrictions are placed on teleporting with private reflective access, then a particular factory object may be granted private reflective access based on a long chain of previously-generated factory objects. It may be difficult, or not possible, to trace the basis for the generation of each previously-generated factory object. Hence, whether module boundaries are observed in the generation of the particular factory object with private reflective access cannot be ensured.

However, by requiring that permissions for teleporting with private reflective access be dropped when a new factory object is generated based on an existing factory object whose principal class is in a different module from the module including the desired principal class of the new factory object, then reflective access within the requirements of module boundaries is guaranteed.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 12:
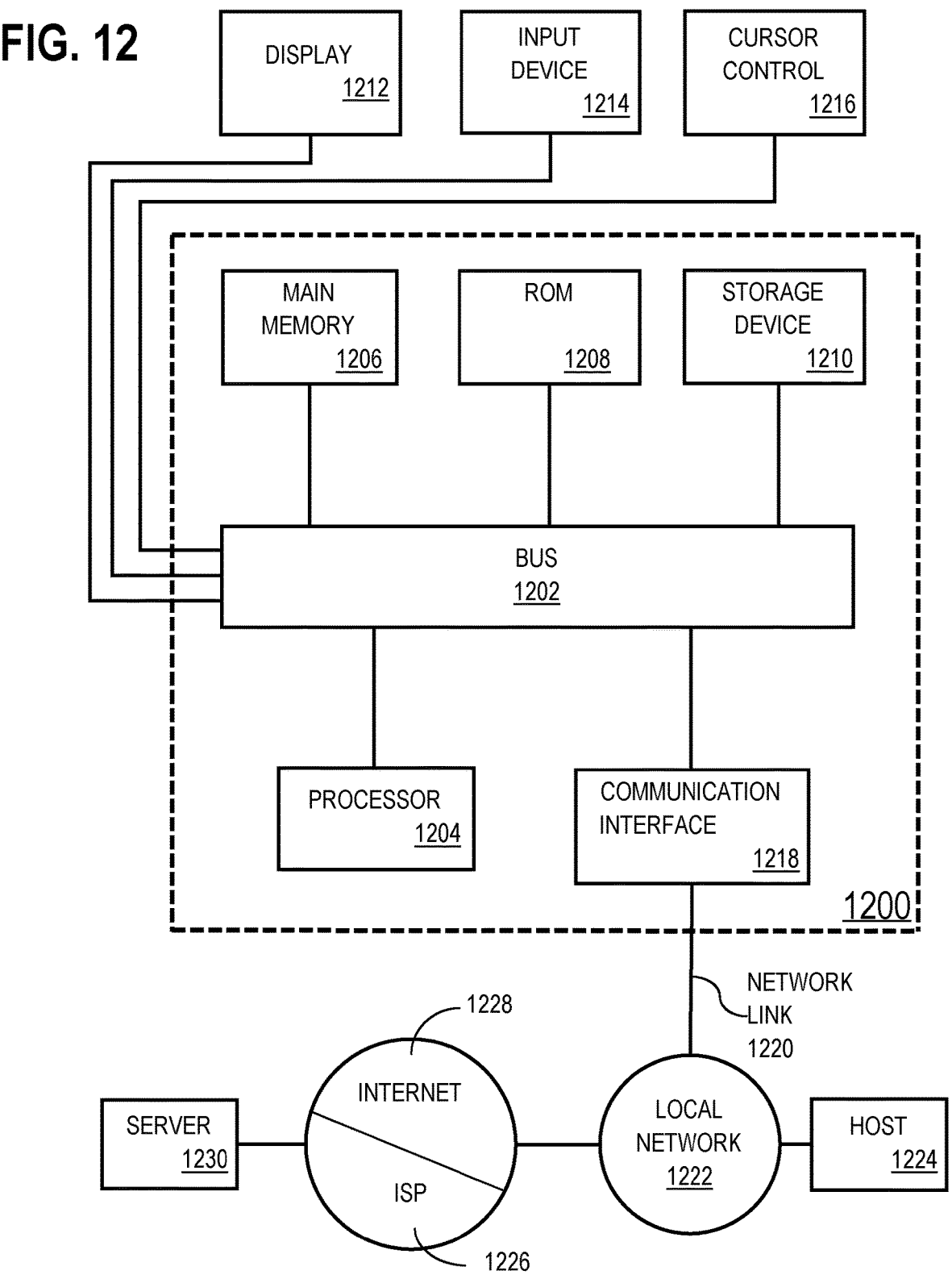
FIG. 12 illustrates a system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    obtaining a first object having reflective access to at least a first set of members of a first principal class associated with the first object;
    wherein the first principal class associated with the first object is in a first module of a plurality of modules associated with a set of code;
    wherein accessibility to each of the plurality of modules is enforced by a compiler or runtime environment based at least on readability of each of the plurality of modules as specified by the set of code;
    receiving a first request to generate a second object having private reflective access to at least a second set of members of a second principal class associated with the second object, the second principal class being in a second module of the plurality of modules;
    wherein the first module and the second module are different;
    wherein the first request identifies the first object as a basis for satisfying an access check required for generating the second object;
    responsive at least to determining (a) a first access mode of the first object allows for generating the second object having private reflective access to the second set of members of the second principal class associated with the second object and (b) the second module grants to at least the first module deep reflective access to at least the second principal class:
        generating the second object, wherein generating the second object comprises:
            setting a second access mode of the second object to disallow generating any target object having private reflective access to any set of members of any desired principal class, associated with the target object, that is different than the second principal class associated with the second module;
    wherein receiving the first request to generate the second object having private reflective access to at least the second set of members of the second principal class comprises receiving the first request to generate the second object having reflective access to at least a private member of the second principal class;
    wherein determining the second module grants to at least the first module deep reflective access to at least the second principal class comprises determining the second module grants to at least the first module reflective access to at least the private member of the second principal class.

2. The one or more media of claim 1, further storing instructions which, when executed by the one or more processors, cause:
    identifying, within the first principal class, a second request to generate the first object having the reflective access to at least the first set of members of the first principal class;
    generating the first object, wherein generating the first object comprises:
        setting the first access mode of the first object to allow for generating the second object having private reflective access to the second set of members of the second principal class associated with the second object.

3. The one or more media of claim 1, wherein the first request is not made within the second principal class.

4. The one or more media of claim 1, wherein generating the second object is further responsive to: determining that the first module reads the second module, based on modular readability.

5. The one or more media of claim 4, wherein a module declaration of the first module specifies a set of one or more modules that the first module reads, and the set of one or more modules includes the second module.

6. The one or more media of claim 1, wherein a module declaration of the second module specifies a set of one or more classes, within the second module, for which deep reflective access is granted to at least the first module, and the set of one or more classes includes the second principal class associated with the second object.

7. The one or more media of claim 1, wherein the second module grants to at least the first module deep reflective access to at least the second principal class by opening at least the second principal class to at least the first module.

8. The one or more media of claim 1, further storing instructions which, when executed by the one or more processors, cause:
receiving a second request to generate a third object having private reflective access to at least a third set of members of a third principal class associated with the third object, the third principal class being in a third module of the plurality of modules;
wherein the first module, the second module, and the third module are different;
wherein the second request identifies the second object as a basis for satisfying an access check required for generating the third object;
responsive to determining that the second access mode of the second object disallows generating any target object having private reflective access to any set of members of any desired principal class different than the second principal class associated with the second module: refraining from generating the third object.

9. The one or more media of claim 8, further storing instructions which, when executed by the one or more processors, cause:
further responsive to determining that the second access mode of the second object disallows generating any target object having private reflective access to any set of members of any desired principal class different than the second principal class associated with the second module: generating an error based on a determination that generating the third object is not allowed.

10. The one or more media of claim 1, further storing instructions which, when executed by the one or more processors, cause:
receiving a second request to generate a third object having private reflective access to at least a third set of members of a third principal class associated with the third object, the third principal class being in a third module of the plurality of modules;
wherein the first module, and the third module are different;
wherein the second request identifies the first object as a basis for satisfying an access check required for generating the third object;
responsive to determining that the third module does not grant to at least the first module deep reflective access to at least the third principal class: refraining from generating the third object.

11. The one or more media of claim 1, further storing instructions which, when executed by the one or more processors, cause:
receiving a second request to generate a third object having private reflective access to at least a third set of members of a third principal class associated with the third object, the third principal class being in the second module;
wherein the second request identifies the second object as a basis for satisfying an access check required for generating the third object;
responsive to determining that the second access mode of the second object disallows generating any target object having private reflective access to any set of members of any desired principal class different than the second principal class associated with the second object: refraining from generating the third object.

12. The one or more media of claim 1, wherein the second object has reflective access to at least one of a private field and a private method of the second principal class.

13. The one or more media of claim 1, wherein:
the first access mode of the first object (a) allows for generating the second object having private reflective access to the second set of members of the second principal class associated with the second object, and (b) allows reflective access to a member that is (i) within the first module, (ii) not within a package including the first principal class, and (iii) not exported by the first module.

14. The one or more media of claim 13, wherein the first access mode is indicated by a single bit.

15. The one or more media of claim 1, wherein:
the first access mode of the first object (a) allows for generating the second object having private reflective access to the second set of members of the second principal class associated with the second object, and (b) allows for generating an executable reference to a member that is (i) within the first module, (ii) not within a package including the first principal class, and (iii) not exported by the first module.

16. The one or more media of claim 1, further storing instructions which, when executed by the one or more processors, cause:
receiving a second request to generate an executable reference to a private member, of the second set of members of the second principal class, based on the second object;
determining that a criteria for generating the executable reference requires that the second object has private reflective access to at least the second set of members of the second principal class;
responsive to determining that the second object has private reflective access to at least the second set of members of the second principal class: generating the executable reference.

17. The one or more media of claim 1, wherein the first object and the second object are of a same class.

18. The one or more media of claim 1, wherein the first object and the second object are lookup objects.

19. A system, comprising:
at least one device including a hardware processor; and
the system being configured to perform operations comprising:
obtaining a first object having reflective access to at least a first set of members of a first principal class associated with the first object;
wherein the first principal class associated with the first object is in a first module of a plurality of modules associated with a set of code;
wherein accessibility to each of the plurality of modules is enforced by a compiler or runtime environment based at least on readability of each of the plurality of modules as specified by the set of code;
receiving a first request to generate a second object having private reflective access to at least a second set of members of a second principal class associated with the second object, the second principal class being in a second module of the plurality of modules;
wherein the first module and the second module are different;

wherein the first request identifies the first object as a basis for satisfying an access check required for generating the second object;
responsive at least to determining (a) a first access mode of the first object allows for generating the second object having private reflective access to the second set of members of the second principal class associated with the second object and (b) the second module grants to at least the first module deep reflective access to at least the second principal class:
generating the second object, wherein generating the second object comprises:
setting a second access mode of the second object to disallow generating any target object having private reflective access to any set of members of any desired principal class, associated with the target object, that is different than the second principal class associated with the second module;
wherein receiving the first request to generate the second object having private reflective access to at least the second set of members of the second principal class comprises receiving the first request to generate the second object having reflective access to at least a private member of the second principal class;
wherein determining the second module grants to at least the first module deep reflective access to at least the second principal class comprises determining the second module grants to at least the first module reflective access to at least the private member of the second principal class.

20. A method, comprising:
obtaining a first object having reflective access to at least a first set of members of a first principal class associated with the first object;
wherein the first principal class associated with the first object is in a first module of a plurality of modules associated with a set of code;
wherein accessibility to each of the plurality of modules is enforced by a compiler or runtime environment based at least on readability of each of the plurality of modules as specified by the set of code;
receiving a first request to generate a second object having private reflective access to at least a second set of members of a second principal class associated with the second object, the second principal class being in a second module of the plurality of modules;
wherein the first module and the second module are different;
wherein the first request identifies the first object as a basis for satisfying an access check required for generating the second object;
responsive at least to determining (a) a first access mode of the first object allows for generating the second object having private reflective access to the second set of members of the second principal class associated with the second object and (b) the second module grants to at least the first module deep reflective access to at least the second principal class:
generating the second object, wherein generating the second object comprises:
setting a second access mode of the second object to disallow generating any target object having private reflective access to any set of members of any desired principal class, associated with the target object, that is different than the second principal class associated with the second object;
wherein receiving the first request to generate the second object having private reflective access to at least the second set of members of the second principal class comprises receiving the first request to generate the second object having reflective access to at least a private member of the second principal class;
wherein determining the second module grants to at least the first module deep reflective access to at least the second principal class comprises determining the second module grants to at least the first module reflective access to at least the private member of the second principal class;
wherein the method is performed by at least one device including a hardware processor.

* * * * *

UNITED STATES PATENT AND TRADEMARK OFFICE
CERTIFICATE OF CORRECTION

PATENT NO. : 11,347,487 B2
APPLICATION NO. : 16/691345
DATED : May 31, 2022
INVENTOR(S) : Chung et al.

It is certified that error appears in the above-identified patent and that said Letters Patent is hereby corrected as shown below:

In the Specification

In Column 8, Line 63, delete "add2and13" and insert -- add12and13 --, therefor.

In Column 18, Lines 9-10, delete "privateLookupin" and insert -- privateLookupIn --, therefor.

In Column 27, Line 29, delete "$C_1$" and insert -- $C_i$ --, therefor.

Signed and Sealed this
Eighth Day of November, 2022

Katherine Kelly Vidal
*Director of the United States Patent and Trademark Office*